(12) United States Patent
McAdam

(10) Patent No.: US 7,550,710 B2
(45) Date of Patent: Jun. 23, 2009

(54) SCALE AND READHEAD APPARATUS

(75) Inventor: Simon Eliot McAdam, Bristol (GB)

(73) Assignee: Renishaw PLC, Gloucestershire (GB)

( * ) Notice: Subject to any disclaimer, the term of this patent is extended or adjusted under 35 U.S.C. 154(b) by 160 days.

(21) Appl. No.: 11/629,457

(22) PCT Filed: Jun. 21, 2005

(86) PCT No.: PCT/GB2005/002431
§ 371 (c)(1),
(2), (4) Date: Dec. 14, 2006

(87) PCT Pub. No.: WO2005/124283
PCT Pub. Date: Dec. 29, 2005

(65) Prior Publication Data
US 2008/0067332 A1    Mar. 20, 2008

(30) Foreign Application Priority Data
Jun. 21, 2004    (GB) ................... 0413827.7

(51) Int. Cl.
*G01D 5/347* (2006.01)
*G01D 5/244* (2006.01)

(52) U.S. Cl. .................... 250/231.13; 250/231.16
(58) Field of Classification Search ............ 250/231.13, 250/231.14, 231.16
See application file for complete search history.

(56) References Cited

U.S. PATENT DOCUMENTS

| | | | | |
|---|---|---|---|---|
| 4,360,730 A * | 11/1982 | Breslow | ............... | 250/231.13 |
| 4,661,696 A * | 4/1987 | Stone | ............... | 250/231.14 |
| 4,733,069 A | 3/1988 | Narutaki | | |
| 4,959,542 A | 9/1990 | Stephens | | |
| 4,998,010 A | 3/1991 | Chandler | | |
| 5,061,952 A | 10/1991 | Ogawa | | |
| 5,128,609 A | 7/1992 | Howley | | |
| 5,241,173 A | 8/1993 | Howley et al. | | |
| 5,661,506 A | 8/1997 | Lazzouni | | |
| 5,792,580 A | 8/1998 | Tomimatu | | |
| 5,793,201 A * | 8/1998 | Nelle et al. | ............ | 324/207.14 |
| 5,856,844 A | 1/1999 | Batterman | | |
| 5,883,298 A * | 3/1999 | Holzapfel et al. | ............. | 73/1.79 |
| 5,943,783 A | 8/1999 | Jackson | | |
| 5,965,879 A | 10/1999 | Leviton | | |
| 5,973,620 A * | 10/1999 | Holzapfel et al. | ............. | 341/11 |
| 6,175,647 B1 | 1/2001 | Schick | | |
| 6,222,174 B1 | 4/2001 | Tullis | | |
| 6,341,013 B1 | 1/2002 | Battiti et al. | | |
| 6,765,195 B1 | 7/2004 | Leviton | | |
| 6,781,694 B2 | 8/2004 | Nahum | | |
| 6,796,043 B2 | 9/2004 | Jackson | | |
| 6,807,499 B2 * | 10/2004 | Burgschat et al | ............. | 702/94 |
| 6,914,235 B2 | 7/2005 | Benner et al. | | |

(Continued)

FOREIGN PATENT DOCUMENTS

EP    0 895 056    2/1999

(Continued)

*Primary Examiner*—John R Lee
(74) *Attorney, Agent, or Firm*—Oliff & Berridge PLC

(57) ABSTRACT

Apparatus for determining angular alignment of a readhead with respect to a scale. The apparatus comprises a scale and readhead. The readhead has at least one sensor which produces an output which is dependent on the angular alignment of the readhead relative to the scale.

17 Claims, 2 Drawing Sheets

U.S. PATENT DOCUMENTS

| | | |
|---|---|---|
| 6,996,494 B2 | 2/2006 | Braasch et al. |
| 7,060,968 B1 | 6/2006 | Leviton |
| 7,116,252 B2 | 10/2006 | Teraguchi |
| 7,184,151 B2 | 2/2007 | Clarke |
| 7,189,985 B2 | 3/2007 | Xie |
| 7,230,727 B2 | 6/2007 | Chu |
| 7,359,054 B2 | 4/2008 | Ausschnitt |
| 2002/0134927 A1 | 9/2002 | Kudo |
| 2003/0016369 A1 | 1/2003 | Benner et al. |
| 2004/0012794 A1 | 1/2004 | Nahum |
| 2004/0194329 A1* | 10/2004 | Drahos et al. ............ 33/366.11 |
| 2004/0218181 A1 | 11/2004 | Jones |
| 2004/0227067 A1* | 11/2004 | Rodi ................... 250/231.14 |
| 2005/0280563 A1 | 12/2005 | Teraguchi |
| 2006/0196950 A1 | 9/2006 | Killicote |
| 2008/0067332 A1* | 3/2008 | McAdam ............... 250/231.13 |

FOREIGN PATENT DOCUMENTS

| | | |
|---|---|---|
| EP | 1 099 936 | 5/2001 |
| EP | 1 106 972 | 6/2001 |
| WO | WO 03-034000 A1 | 4/2003 |

* cited by examiner

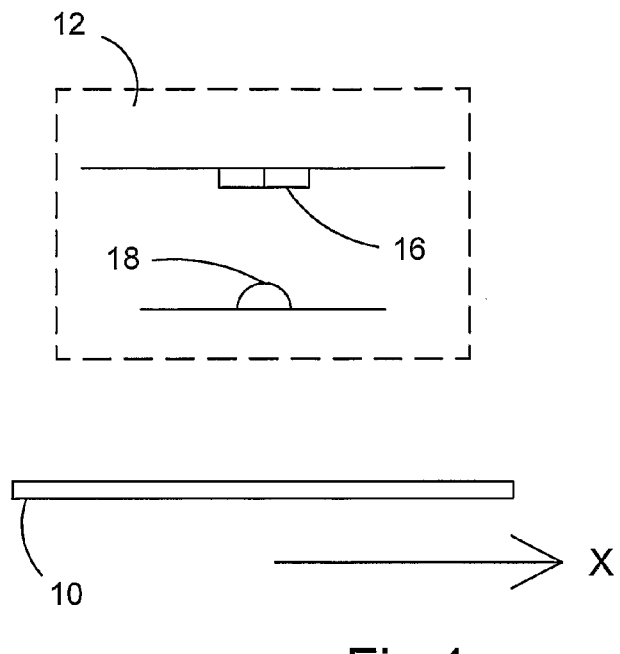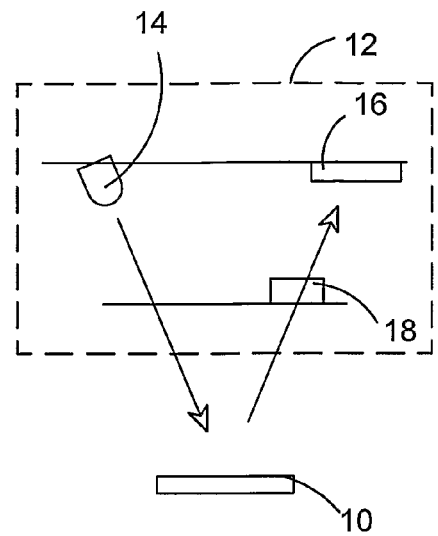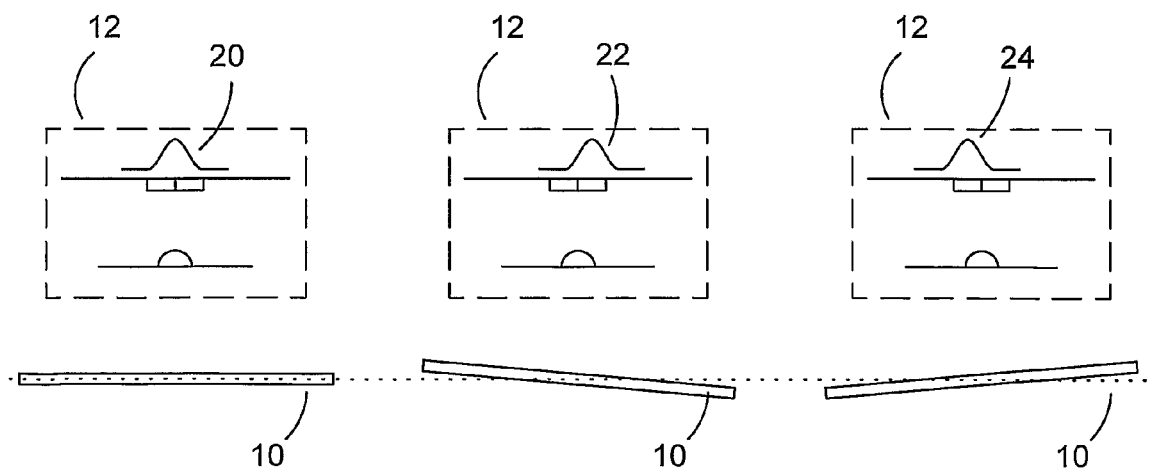

SCALE AND READHEAD APPARATUS

The present invention relates to a scale reading system comprising a scale and a readhead movable relative to one another. In particular the present invention relates to a scale reading system including means for determining the angular alignment of the readhead relative to the scale.

A known form of scale reading apparatus for measuring relative displacement of two members comprises a scale on one of the members, having scale marks defining a pattern and a readhead provided on the other member. An optical scale reading apparatus has means for illuminating the scale and detecting means in the readhead responsive to resultant light patterns to produce a measure of relative displacement of the scale and readhead. A scale having its marks in a periodic pattern is known as an incremental scale and provides an output of up and down counts. A scale may be provided with reference marks, which when detected by the readhead enable the exact position of the readhead to be determined. The scale may have absolute code marks which enable the absolute position of the readhead to be determined anywhere on the scale.

Scale and readhead systems are not limited to optical systems. Magnetic scale reading systems are also known.

The readhead can be adjusted relative to the scale by its rideheight, pitch, roll and yaw. By correctly aligning the readhead to the scale, the optimum signal can be produced. If the readhead is misaligned the signal intensity may be reduced and some reference marks or absolute code may not be detected.

It is known to align a readhead relative to a linear scale by using a shim. This is a spacer which is placed between the scale and the readhead thereby setting the alignment of the readhead whilst it is fixed in position. However for some systems it may not be practical to use a shim due to physical constraints, moreover for rotary scales in which the scale is mounted on a circular component, the use of a shim may not be practical. Use of a shim on a rotary scale has the disadvantage that a different shim design may be required for scales of different diameters. Furthermore, for rotary scales of small radii installation using a shim becomes difficult.

In a rotary system, any linear shift of the readhead causes the readhead to read a pitched section of scale. The effect of this readhead offset is greater in rotary scales with small diameters.

The present invention provides apparatus for determining angular alignment of a readhead with respect to a scale, the apparatus comprising at least one sensor in the readhead wherein the at least one output of the at least one sensor is dependent on the angular alignment of the readhead relative to the scale.

The apparatus may determine the angular alignment about an axis parallel to the plane of the scale. For a non linear scale the apparatus may determine the angular alignment about an axis parallel to an approximation plane of the scale adjacent the readhead or to a tangent of the scale adjacent the readhead.

The at least one sensor may comprise at least one optical detector. In this case the readhead also includes a light source. The at least one optical detector may comprise a split detector.

The at least one sensor may comprise at least one proximity sensor, for example a capacitance, inductance or magnetic sensor.

The scale may comprise an optical scale. Alternatively the scale may comprise a magnetic scale. The scale may comprise a linear or a rotary scale.

The angular alignment of the readhead relative to the scale may be pitch or roll. Alternatively it may be local scale flatness.

The output may be an electrical output.

The electrical output may be a voltage output. Electrical output may be displayed in software, an electrical meter or an indicator to show optimum alignment, for example an LED display. Alternatively an audible signal, such as a buzzer, may be used to indicate optimum alignment.

The invention will now be described with reference to the accompanying drawings in which:

FIG. 1 is a side-view of an optical scale and readhead;

FIG. 2 is an end-view of an optical scale and readhead;

FIGS. 3a, 3b and 3c are side-views of optical scales and readheads with the readhead having zero pitch and pitched to the left and to the right respectively;

Figure 4:
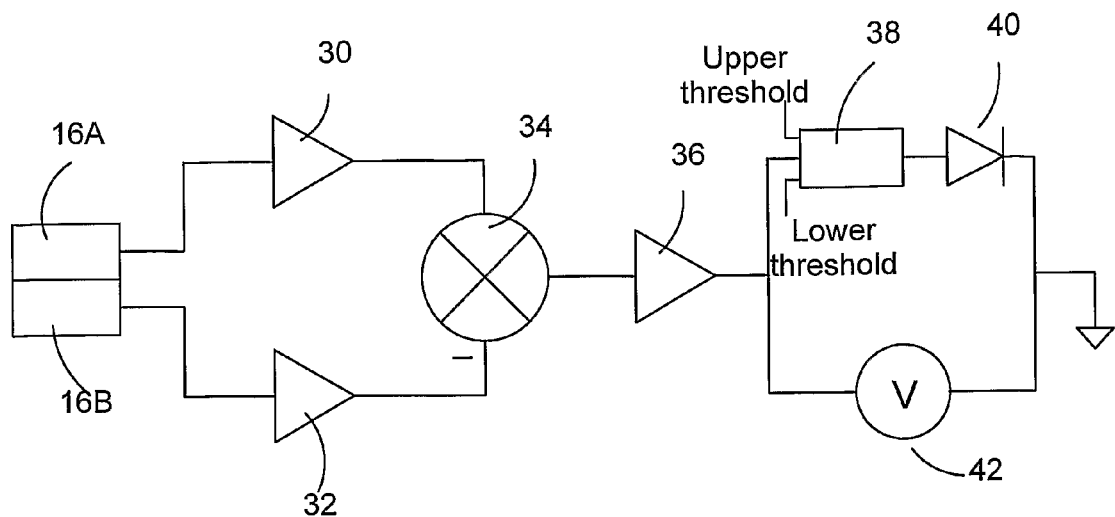
FIG. 4 is a block diagram of the electronics in the readhead.

FIGS. 1 and 2 illustrate side and end views of a first embodiment of the invention and show a scale 10 and readhead 12 movable with respect to one another along the x axis.

The readhead 12 comprises a light source 14, a split detector 16 and a lens 18. Light from the light source 14 is reflected by the scale 10 and imaged by lens 18 onto the detector 16.

FIGS. 3a, 3b and 3c illustrate the scale and readhead parallel to one another tilted in first and second directions respectively. In FIG. 3a the readhead 12 is parallel to the scale 10. When the readhead is thus correctly angularly aligned with the scale, the light falls evenly on the two halves of the split detector as shown by the light intensity distribution 20 on the detector. In FIGS. 3b and 3c the readhead is tilted relative to the scale and the light thus falls unevenly onto the two halves of the split detector as shown by the light intensity distribution 22 and 24 respectively.

The outputs of the two halves of the split detectors are compared to produce a voltage output which indicates the amount of and direction of pitch. FIG. 4 illustrates a block diagram of the electronics which convert outputs from the split detector into a pitch signal.

Outputs from the two halves of the split detectors 16a, 16b are converted into voltage outputs by amplifiers 30,32 and the difference between the voltages is determined at comparator 34 and buffer 36. An LED 40 is used to produce a signal when the voltage difference is within a predetermined range using a window comparator 38. A voltmeter 42 is used to give a voltage output. Although FIG. 4 shows both an LED indicator and voltmeter, only one form of indicating means is required.

The voltage output may be used to light one or more LEDs on the readhead which indicates when the pitch is within an acceptable range. Alternatively the voltage output may be sent to an external voltmeter so that the user can adjust the pitch by using the output voltage. The voltage output may be sent to software which includes a pitch indicator.

The voltage output may be sent to an audible indictor, such as a buzzer. The user may thus adjust the pitch by using the indicating means to indicate when the pitch is within an acceptable range.

The pitch indicator may display the magnitude of the angular position (e.g. pitch or roll) of the readhead relative to the scale or indicate the direction the readhead should be adjusted (for example a display of arrows in the relevant direction).

Although the above embodiment describes the use of a split detector, any detector which enables the position of the imaged light to be detected may be used. For example a pixelated detector such as a charge-coupled detector (CCD) may be used.

When the readhead is assembled, the position of the lens may be adjusted so that that the output of the detector is zero voltage for zero pitch of the readhead. Thus the readhead can be used straightaway on any system.

Figure 5:
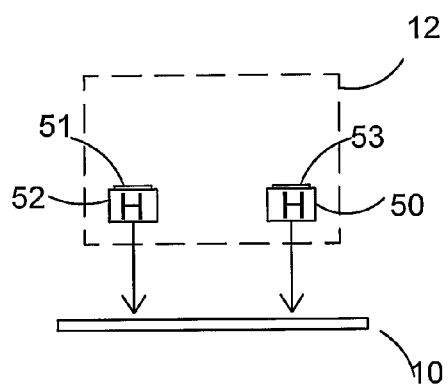
FIG. 5 is a side-view of a scale and readhead including Hall sensors.

FIG. 5 illustrates a second embodiment of the invention in which a non-optical pitch detector is used. FIG. 5 illustrates a ferromagnetic scale 10 for example, steel, and a readhead 12. The scale reading system may be a magnetic system or an optical system. Two magnetic sensors, for example Hall sensors 50,52 and bias magnets 51,53 are provided in the readhead, spaced apart along the direction of the length of scale. As the Hall sensors measure the distance from the scale, if the scale and readhead are parallel the voltage outputs from the Hall sensors will be equal. If the readhead and scale are pitched relative to one another, the output of the two sensors can be used to determine the direction and amount of pitch. Similar electronics as described in FIG. 4 can be used. The two Hall sensors can be replaced by a differential Hall sensor.

Any other sensor which measures distance from the scale can be used in a similar fashion. For example pitch can be measured using a pair of capacitance sensors or inductance sensors.

Although the above embodiments describe the measurement of pitch between a readhead and scale, it can also be used to measure roll by turning the split detector or two detectors by 90° (i.e. so the detectors are transverse to the scale). This invention has the advantage that it allows angular orientation about one axis to be measured independently of other axes and rideheight, i.e. pitch can be measured independently of roll, yaw and rideheight.

The flatness of the scale is known to cause reading errors in some readhead systems.

Figure 6:
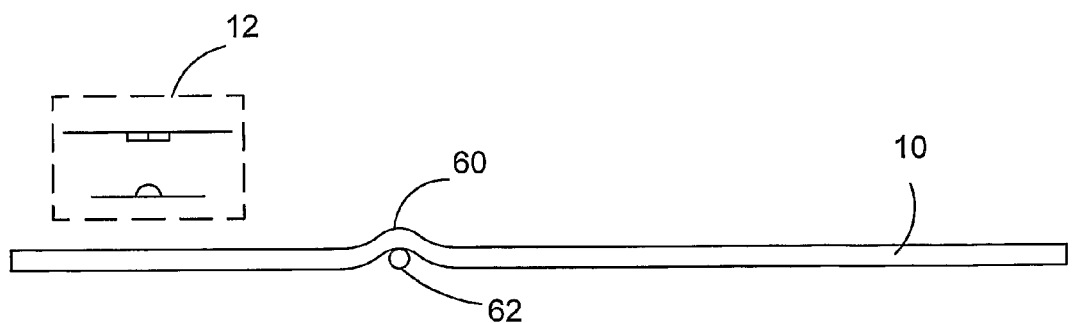
FIG. 6 shows a scale with a flatness error.

This invention may also be used to measure the flatness of application of the scale onto a surface. FIG. 6 illustrates a linear scale 10 in which an undulation 60 has been caused by dirt 62 beneath the scale. The readhead of the present invention may be used for an installation check to detect the unevenness of the scale which will cause a local pitch error. The readhead is run along the length of the scale to check that the pitch of the scale is within acceptable limits throughout the length of the scale. This method has the advantage that it is quick and non-contact.

This invention could also be used in a calibration routine. For example, where a readhead has a quantifiable relationship between electrical signal amplitude and pitch, then the measurement of readhead pitch can be used to compensate for the effect on the electrical signal amplitude.

This invention is suitable for use with both linear and rotary scales. It is also suitable for use with two-dimensional scales. The invention may be used with incremental and absolute scales.

The invention claimed is:

1. Apparatus for determining angular alignment of a readhead with respect to a scale, the apparatus comprising at least one sensor in the readhead wherein at least one output of the at least one sensor is dependent on the angular alignment of the readhead relative to the scale about an axis that is parallel to the surface of the scale adjacent the readhead and is independent of the angular alignment of the readhead relative to the scale about other axes.

2. The apparatus according to claim 1 wherein the at least one sensor comprises at least one optical detector.

3. The apparatus according to claim 2 wherein the readhead includes a light source.

4. The apparatus according to claim 3 wherein the at least one optical detector comprises a split detector.

5. The apparatus according to claim 1 wherein the at least one sensor comprises at least one proximity sensor.

6. The apparatus according to claim 1 wherein the scale comprises an optical scale.

7. The apparatus according to claim 1 wherein the scale comprises a magnetic scale.

8. The apparatus according to claim 1 wherein the scale comprises a rotary scale.

9. The apparatus according to claim 1 wherein the scale comprises a linear scale.

10. The apparatus according to claim 1 wherein the angular alignment of the readhead relative to the scale comprises pitch.

11. The apparatus according to claim 1 wherein the angular alignment of the readhead relative to the scale comprises roll.

12. The apparatus according to claim 1 wherein the angular alignment of the readhead relative to the scale comprises local scale flatness.

13. The apparatus according to claim 1 wherein the output produces a visual display.

14. The apparatus according to claim 1 wherein the output produces an audible signal.

15. The apparatus according to claim 1 wherein the output is used to indicate when the relative alignment of the scale and readhead is within an optimum range.

16. The apparatus according to claim 1 wherein the output is used to indicate the magnitude of the angular position of the readhead relative to the scale.

17. The apparatus according claim 1 wherein the output is used to indicate a required direction of adjustment of the readhead relative to the scale.

* * * * *